Nov. 4, 1958

S. J. MARCUS 2,859,293

ACCELERATION RESPONSIVE DEVICE

Filed May 7, 1953

INVENTOR.
STANLEY J. MARCUS

BY
ATTORNEYS

United States Patent Office 2,859,293
Patented Nov. 4, 1958

2,859,293

ACCELERATION RESPONSIVE DEVICE

Stanley J. Marcus, China Lake, Calif.

Application May 7, 1953, Serial No. 353,694

6 Claims. (Cl. 200—61.47)

(Granted under Title 35, U. S. Code (1952), sec. 266)

The invention described herein may be manufactured and used by or for the Government of the United States of America for governmental purposes without the payment of any royalties thereon or therefor.

This invention relates to a device which is adapted to respond to a change from positive to negative acceleration of a body. The invention takes the form of an electrical switch and it is a purpose and objective of the invention that it will be extremely sensitive to the said change in acceleration, i. e., that it be extremely sensitive and reliable in responding, that is, in giving a signal in response to a change from positive to negative acceleration.

The invention will find various applications and uses, one of the principal applications of the invention being to provide a check point in the trajectory of a missile by giving a signal when the acceleration changes from positive to negative. In other words, in a missile such as a rocket, after the expiration of burning of the propellant charge the acceleration will change from positive to negative and this invention will serve to provide a definite check point as to when and where in the trajectory of the missile this occurs.

In a particular application of the invention it has been used to effect the separation between the booster and forward rocket components of a two-stage rocket missile. In this particular missile the booster and forward components were held together by a connector ring which could be separated by explosive bolts in the ring and the circuits to the explosive bolts were controlled by the switch of this invention. When the explosive bolts are energized the connector ring is separated and jettisoned and the forward and rear components of the missile then separate.

The device of this invention has been found highly adaptable for its purpose, other types of acceleration switches having offered serious difficulties such as difficulties in calibrating, friction, binding, etc.

A primary purpose and objective of the invention is to provide a device which is very reliably, positively and accurately responsive to a change from positive to negative acceleration, i. e., zero acceleration.

Another object of the invention is to provide an extremely sensitive but yet positive and accurate electrical switch responsive to a change from positive to negative acceleration.

Another object of the invention is to provide a switch as in the foregoing object adapted for use in a missile and particularly a two-stage missile wherein the operation of the switch effects the separation of the forward and rear components of the missile.

Another object of the invention is to provide a switch as in the foregoing wherein the switch is arranged to compensate for lateral accelerations, the switch taking the form of a mercury switch having a frusto-conical cavity for the mercury so positioned that lateral or side accelerations produce a forward component of force on the mercury tending to move it in a direction to close the switch.

Another object of the invention is to provide an acceleration responsive mercury switch comprising a casing having a frusto-conical internal shape with electrodes at the larger end which are bridged when the mercury moves to the larger end.

Numerous further objects and additional advantages of the invention will become apparent from the following detailed description and annexed drawings wherein.

Figure 3:
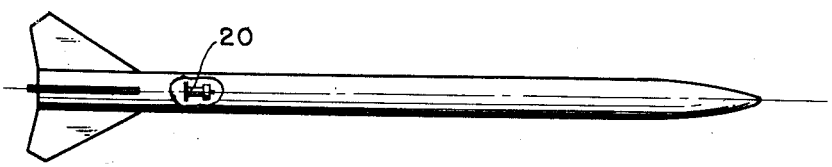

Fig. 3 of the drawings is a schematic view of a two-stage rocket having the switch of this invention mounted therein with the axis of the body of the switch parallel to the missile axis.

Figure 1:
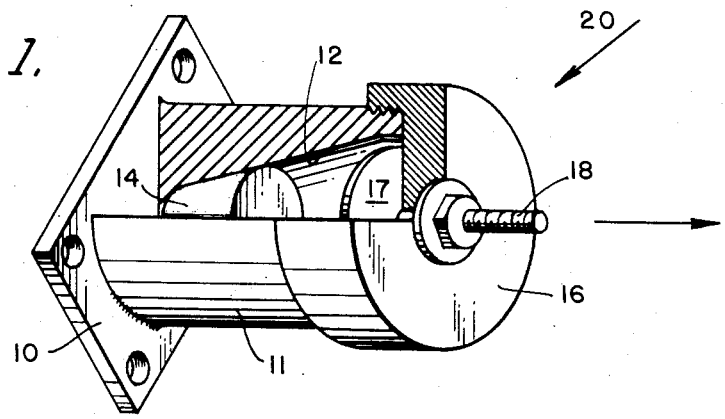
Fig. 1 is a perspective cutaway view of the invention during positive acceleration.
Figure 2:
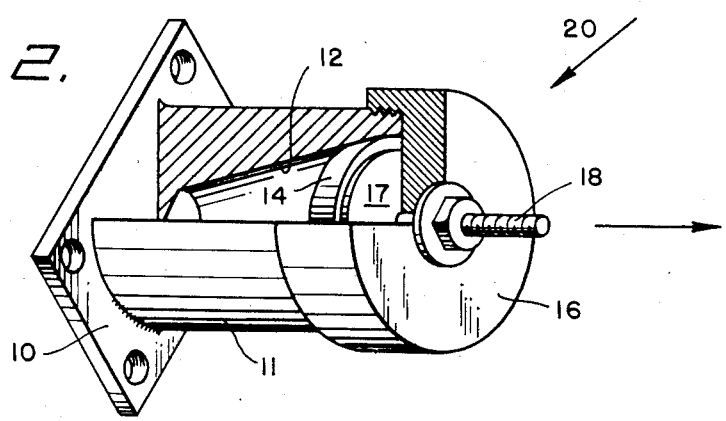
Fig. 2 is a perspective cutaway view of the invention during negative acceleration.

Referring to Figs. 1 and 2 of the drawings, numeral 10 designates a mounting plate for the switch whereby it may be mounted in a body which will be subjected to changes in acceleration. It is to be understood that the switch assembly would be mounted along the line of motion of the body and in the case of a missile this would, of course, be parallel to the axis of the missile (see Fig. 3). Attached to the plate 10 and extending therefrom is a cylindrical housing or switch body 11 which is made of electrically conductive material. The interior of the body 11 is frusto-conical in shape as shown in the drawings, the larger end of the cavity being the forward end and the electrodes being located at this end. The switch is of a mercury type, there being shown a body of mercury 14 in Fig. 1 at one end of the switch. Casing or body 11 is closed by a cylindrical screw cap 16 which is made of insulating material and engages the body 11 in screw threaded relationship as shown.

Attached to the interior of the cap 16 centrally thereof is a disc 17 or contact button which forms one of the electrodes and it is attached to the cap 16 by a bolt 18 as shown which extends through the cap. The periphery of the disc or contact button 17 is spaced from the adjacent portions of the body 11 of the switch. The button 17 and the adjacent metal portions of the body 11 form the electrodes of the switch and when the mercury moves to this end of the switch it bridges the space between the electrodes for completing an electrical circuit. The circuit connections may, of course, be made to the plate 10, for example, and the bolt 18.

One of the problems in connection with the application of the switch of this type, particularly in missiles, was the effect of side or lateral accelerations resulting from yaw oscillations of the missile. Ordinarily, of course, a missile travelling along a trajectory is subject to a certain amount of yawing, that is, oscillating about the center of gravity of the missile. This problem is met by the internal conformation of the switch body involving the frusto-conical shape with the larger end forward whereby purely side or lateral accelerations subject the mercury to a forward force component tending to close the switch. The design of the angle of the cone is made such that the rearward acceleration imparted to the mercury during burning of the propellant in the booser rocket is much greater than the forward component caused by yaw oscilltaions. Thus, the switch will only be closed after completion of burning as desired, that is, at the time that the acceleration passes through zero from positive to negative. It will be observed that when the acceleration changes from positive to negative the mercury is completely free to pass to the larger end of the switch body unrestrictedly so that the functioning of the switch at the precise instant desired is secured. The construction and arrangement is such as to insure this complete reliability and positiveness of action.

Fig. 3 is a schematic showing of a rocket having the switch of this invention mounted therein. In this position of the switch in a missile the liquid mercury fills either the rear or the forward end of the switch body under positive or negative acceleration respectively. It can be seen that accelerations imparted by yaw oscillations will have the effect on the mercury as described above.

The construction of the switch is, of course, susceptible to various modifications and may have numerous applications where it is desired to secure a response immediately after the instant of zero acceleration during a change from positive to negative acceleration. It is, of course, within the scope and realm of the invention that electrodes might be placed at the opposite end of the switch body for indicating a change from negative to positive acceleration, etc.

As pointed out in the foregoing, one of the applications of the switch is in a two-stage rocket for effecting the separation of the booster from the forward component. The switch could, of course, have other applications where its function is desired to be achieved reliably, such as in the ignition of successive booster charges in the carriage firings of rockets or the like. It might also be utilized for the initiation of firing of booster destruction charges after completion of burning of the propellant. In connection with missiles, the switch of this invention provides a very definite, positive and reliable check point in the trajectory of the missile in that it checks and signals the exact point of zero acceleration which is determined by the duration of the booster propellent thrust. The point of zero acceleration, of course, occurs when the thrust falls below the aerodynamic drag force to which the missile is subjected.

While mercury is the most commonly electrically conductive fluid used in this switch, it is to be understood that an equivalent electrically conductive fluid can be utilized.

The foregoing disclosure is representative of a preferred form of my invention. It is intended that the disclosure be interpreted in an illustrative rather than a limiting sense and that the boundaries and limits of the invention be in accordance with the claims appended hereto.

What I claim is:

1. In combination with a missile which is subject to yaw oscillations during flight, an acceleration responsive switch comprising a housing having formed therein a closed chamber of frusto-conical shape, said housing being disposed with the axis of said chamber parallel to the missile axis and the larger end of the chamber forward, a pair of electrodes at one end of said chamber, and mercury partially filling said chamber, forward acceleration of the missile causing a rearward force on said mercury sufficient to move the mercury rearward, said frusto-conical shaped chamber operable to cause any purely side or lateral accelerations during flight to subject the mercury to a forward force component, said forward force component being less than the rearward force on the mercury during acceleration of the missile, deceleration of the missile causing a sufficient forward force on the mercury to move it forward and activate the switch.

2. The arrangement according to claim 1 wherein said electrodes are disposed at the forward end of said chamber.

3. The arrangement according to claim 2 wherein said housing is comprised of an electrically conductive material and forms one of said electrodes, the other of said electrodes comprising a disc fixed to and insulated from the forward wall of said chamber in concentric relationship to the latter.

4. The arrangement according to claim 1 wherein the angle between the conical wall of said chamber and the chamber axis is relatively small.

5. In combination with a missile subject to acceleration and deceleration during flight, an acceleration and deceleration responsive switch comprising a housing having formed therein a closed chamber of frusto-conical shape, said switch being attached to said missile with the base of the cone forward as respects the direction of travel of the missile and with its long axis parallel to the long axis of the missile, at least two electrodes at one end of said chamber and mercury in said chamber in an amount to partially fill the chamber, whereby forward acceleration of the missile causes a rearward force on said mercury sufficient to move it rearward and maintain the switch in an inactivated condition and deceleration of the missile causes a sufficient forward force on the mercury to move it forward and activate the switch, and said frusto-conical shaped chamber is operable to cause any non-forward accelerations resulting from yawing of the missile to subject the mercury to a forward force component which is less than said rearward force so that said forward component will not activate the switch when the missile is yawing during acceleration but will aid in moving the mercury forward when the missile is yawing at the time of deceleration.

6. In combination with a missile subject to acceleration and deceleration during flight, an acceleration and deceleration responsive switch comprising a housing having formed therein a closed chamber of frusto-conical shape, said switch being attached to said missile with the base of the cone forward as respects the direction of travel of the missile and with its long axis parallel to the long axis of the missile, at least two two electrodes at one end of said chamber, and mercury in said chamber in an amount to partially fill the chamber, the angle of the wall of said chamber being such that the mercury is subjected to a forward force when the missile is yawing, the force being insufficient to overcome the rearward force to which the mercury is subjected during acceleration.

References Cited in the file of this patent

UNITED STATES PATENTS

| | | |
|---|---|---|
| 2,072,362 | Erich | Mar. 2, 1937 |
| 2,161,411 | Erich | June 6, 1939 |
| 2,404,179 | King | July 16, 1946 |

FOREIGN PATENTS

| | | |
|---|---|---|
| 482,951 | Great Britain | Apr. 6, 1938 |